United States Patent

[11] 3,534,760

| [72] | Inventors | Slawomir Kowalski<br>Rockaway, New Jersey;<br>Donald A. Worden, Pompton Plains, 0 |
|---|---|---|
| [21] | Appl. No. | 701,213 |
| [22] | Filed | Jan. 29, 1968 |
| | | Oct. 20, 1970 |
| [73] | Assignee | Marotta Valve Corporation<br>Boonton, New Jersey<br>a corporation of New Jersey |

[54] REGULATOR ASSEMBLY FOR MANUAL OPERATION
12 Claims, 5 Drawing Figs.

[52] U.S. Cl. .................................................. 137/116,
 92/46, 137/116.5, 267/1
[51] Int. Cl. ............................................. G05d 16/06,
 F16j 3/00
[50] Field of Search............................................ 137/102,
 115, 116, 116.3, 116.5; 138/42; 267/1(CZA. GZD.
 GZE. N); 92/45, 46

[56] References Cited
UNITED STATES PATENTS

| 1,826,597 | 10/1931 | Brecht .................. | 267/1(CZS)UX |
| 2,104,700 | 1/1938 | Russel ..................... | 137/116 |
| 2,517,061 | 8/1950 | Von Stackelberg .......... | 137/625.48X |
| 2,889,781 | 6/1959 | Thompson .................. | 92/45X |
| 2,973,015 | 2/1961 | Thompson .................. | 92/46 |
| 3,042,061 | 7/1962 | Dobrikin ..................... | 137/102 |
| 3,361,151 | 1/1968 | Van House .................. | 137/115 |
| 3,411,523 | 11/1968 | Lapera ....................... | 137/116.5 |

Primary Examiner—William F. O'Dea
Assistant Examiner—David J. Zobkiw
Attorney—Sandoe, Neill, Schottler and Wikstrom ABSTRACT: This specification discloses a pressure regulator having an axially movable shaft that serves as a slide valve. This shaft has a port through its circumference and as the shaft moves the port travels past an 0-ring. The shaft is moved in response to the expansion and contraction of a bellows constructed from tapered spring washers to produce a more sensitive regulator. As this pressure in the regulator increases, it contracts the bellows, and the shaft moves to shut off further supply of gas. Excessive pressure moves the slide valve to a vent position. As gas continues to be withdrawn, the pressure surrounding the bellows drops and the bellows expands and moves the shaft to admit more gas into the chamber surrounding the bellows. There is a manual adjustable for moving the O-ring axially along the shaft to change the extent to which the bellows must expand and contract to open and close the slide valve. This changes the downstream pressure.

Patented Oct. 20, 1970

3,534,760

INVENTORS
Slawomir Kowalski
Donald A. Worden
BY Sandoe, Neill,
Schottler & Wilstrom
ATTORNEYS.

REGULATOR ASSEMBLY FOR MANUAL OPERATION

BRIEF DESCRIPTION OF THE INVENTION

This invention is a simplified pressure regulator using an axially movable shaft and an O-ring as a slide valve for controlling the flow of high-pressure gas to the interior of the regulator. The sensing unit of the regulator is a bellows, preferably made of two tapered Bellville washers which enclose a chamber having an O-ring seal around the circumference of the washers where they contact with one another at their peripheral portions. This provides a bellows with a low spring rate and minimum friction which makes the pressure regulator more sensitive and capable of maintaining closer control of the downstream pressure.

The delivery pressure of the regulator is adjustable by changing the location of the O-ring so that the slide valve assembly opens and closes at different degrees of expansion and contraction of the bellows. The movement of the O-ring is effected by a simple manual adjustment provided by a threaded end portion of the housing having a handle for moving it through desired angles to effect accurate control of the adjustment.

Another feature of the invention relates to venting of excess pressure from the regulator by moving the slide valve into a third position if the downstream pressure exceeds a predetermined value for which the regulator is adjusted.

Other objects, features and advantages of the invention will appear or be pointed out as the description proceeds.

BRIEF DESCRIPTION OF THE DRAWINGS

In the drawing, forming a part hereof, in which like reference characters indicate corresponding parts in all the views.

DESCRIPTION OF THE PREFERRED EMBODIMENT

Figure 3:
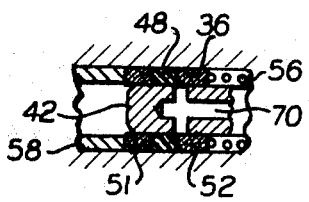
FIGS. 3, 4 and 5 are fragmentary detail views showing the different positions of the slide valve illustrated in FIG. 1.

The regulator of this invention includes a housing 10 having an inlet port 12 and a delivery or outlet port 14. Both of these ports are threaded to receive appropriate fittings. At the left-hand end of the housing 10, there is an extension 16 which is externally threaded to receive a fitting 18. There are slugs 20, preferably made of nylon, held in contact with the threads on the extension 16 by screw plugs 22 threaded into openings through the side of the fitting 18. By adjusting the plugs 22, the friction of the slugs 20 on the threads of the extension 18 can be regulated.

A handle 24 threads into an opening in one side of the fitting 18 and this handle is used to locate the fitting 18 on the threads of the housing extension 16, and to move the fitting 18 toward and from the side of the housing to adjust the regulator in a manner which will be explained.

Figure 2:
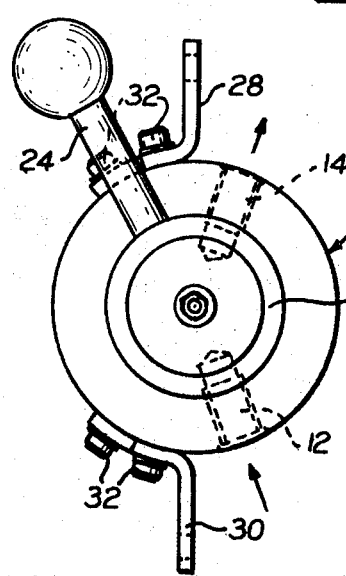
FIG. 2 is an end view, on a reduced scale, of the pressure regulator shown in FIG. 1.

The construction illustrated has brackets 28 and 30, best shown in FIG. 2, attached to the housing 10 by screws 32. These brackets are used for mounting the pressure regulator on a bulkhead or at any other location where it is to be used.

Within the housing 10 there is a bore 36 which communicates at its right-hand end with a chamber 38. At the left-hand end of the bore 36, there is a counterbore 40 which opens through the end of the housing extension 16. A stem 42 is located in the bore 36 and extends for most of the length of the bore and beyond the bore 36 into the chamber 38. The end of the stem 42 in the chamber 38 is of increased diameter and provides a flange 46.

The diameter of the part of the stem 42 which is located in the bore 36 is substantially smaller than the diameter of the bore 36 along most of the length of the bore 36, and the clearance between the stem 42 and the wall of the bore 36 contains O-rings 48 and 49, and porous rings 51 and 52, and a back-up ring 54. A helical compression spring 56 is located in an axial clearance between the ring 52 and the back-up ring 54.

A support 58 has a large-diameter portion which slides in the counterbore 40 as a guide and has a small-diameter portion which slides in the bore 36. The right-hand end of the support 58 contacts with the ring 51 and holds this ring against the O-ring 48 and the O-ring 48 against the ring 52, and also holds this assembly of rings 48, 51 and 52 against the end of the spring 56 so that the spring 56 is maintained under some pressure. This spring pressure holds the back-up ring 54 against the O-ring 49 and holds the O-ring 49 against a shoulder in the bore 36.

A rounded end face 60 of the support 58 contacts with a socket in the end of a screw plug 62 which threads into the fitting 18. This screw plug 56 has a recessed head 64 for receiving a wrench and has a plastic insert 66 for providing friction to prevent the plug 62 from turning as a result of vibration.

Rotation of the screw plug 62 in one direction moves it toward the right and displaces the support 58 in a direction to move the rings 48, 51 and 52 toward the right, with resulting compression of the spring 56. Rotation of the screw plug 62 in the opposite direction permits the spring 56 to displace the rings 48, 51 and 52 and the support 58 toward the left.

There is an axially extending passage 70 in the stem 42. This passage 70 opens through the end of the flange 46 at one end and communicates with radially extending cross passages 72 at its other end. These passages 72 have a diameter less than the width of the contact area of the O-ring 48 on the stem 42 so that when the cross passages 72 are in register with the O-ring 48, the O-ring prevents flow of gas into or out of these cross passages 72. Thus the stem 42 and the O-ring 48 provide a slide valve which is closed when the cross passages 72 are in register with the O-ring 48 but which is open when the cross passages 72 are moved to either side of the O-ring 48.

The rings 51 and 52 are preferably made of sintered metal and they are sufficiently porous so that they permit relatively free flow of gas but serve as filters in addition to their function as back-up rings for the O-ring 48.

The stem 42 moves axially in response to changes in pressure in the chamber 38. The structure for producing this axial movement will be explained, but for the present it is sufficient to understand that the movement of the stem 42 locates the cross passages 72 in the different positions shown in FIGS. 3—5. When the cross passages 72 are in the position shown in FIG. 3, the O-ring 48 prevents flow of gas toward the left in the clearance between the cross passages 72 and the wall of the bore 36; but gas can flow into the cross passages 72 from the clearance on the right of the O-ring 48. Thus gas entering the regulator through the inlet 12 (FIG. 1) flows into the space around the spring 56, through the porous ring 52 and into the cross passages 72 and axial passage 70. From the passage 70 this high-pressure gas flows into the chamber 38.

Figure 4:
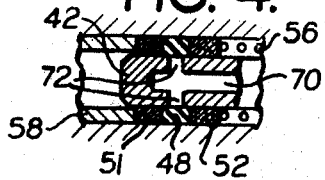

When the pressure in the chamber 38 builds up to a predetermined value, the stem 42 moves into the position shown in FIG. 4 and this shuts off further flow of gas into the cross passages 72 and prevents further flow of gas into the axial passage 70.

Figure 5:
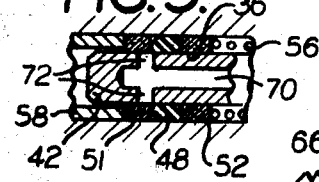
Figure 1:
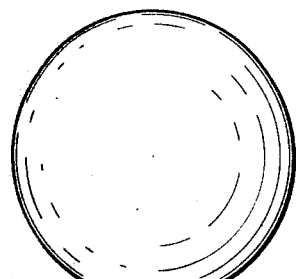
FIG. 1 is a sectional view through a pressure regulator made in accordance with this invention.
Figure 1:
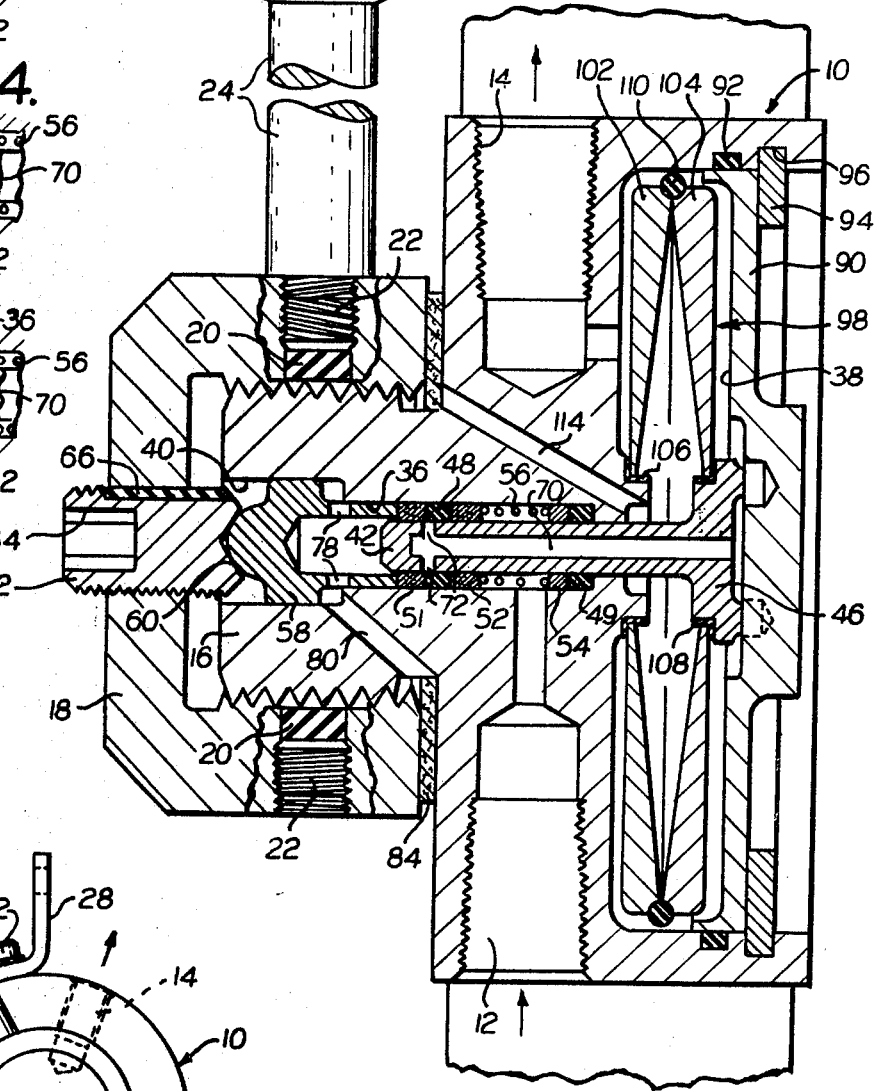

If the stem 42 moves further to the left, into the position shown in FIG. 5, the gas can flow through the axial passage 70, out through the cross passages 72 and through the porous ring 51 into the unsealed space in the support 60 (FIG. 1). There are openings 78 through the wall of the support 60 for the escape of gas from within the support 60. These openings 78 communicate with a vent passage 80 which opens through a side of the housing 10 at the region where the extension 16 joins the main part of the housing 10. In the preferred construction there is a filter washer 84, preferably made of polyurethane, compressed between the fitting 18 and a side of the housing 10. This filter washer 84 expands and contracts as the fitting 18 is screwed toward the left and right, respectively, along the threads of the housing extension 16. The purpose of the filter washer 84 is to prevent dust or other foreign matter from entering the regulator through the vent passage 80.

The chamber 38 is formed by a recess in the housing 10 closed by an end wall 90. This end wall fits into the recessed housing 10 like a piston and is sealed by an O-ring 92. Displacement of the end wall 90 by pressure in the chamber 38 is prevented by a snap ring 94 which fits into a circumferential groove 96.

Within the chamber 38 there is a bellows 98 formed by two tapered Bellville washers 102 and 104. The inner edges of these washers 102 and 104 contact with plastic gaskets 106 and 108. The gasket 106 is located on a shoulder on the housing 10; and the gasket 108 is located on the flange 46. The confronting peripheral portions of the washer 102 and 104 touch one another and the joint formed by these confronting faces is sealed by an O-ring 110.

The washers 102 and 104 are slightly dished so as to leave space between them throughout most of their extent and this space is vented through a vent passage 114 extending through the housing 10 and opening at a location which is protected from dust and dirt by the filter washer 84.

When the pressure in the chamber 38 increases sufficiently to bend the dished washers 102 and 104 toward one another, the flange 46, which forms the center portion of the bellows 98, is moved toward the left in FIG. 1 to shift the stem 42 axially in the same direction. Because of the taper of the washers 102 and 104, they have a softer spring rate than the walls of an ordinary bellows and this makes the regulator more sensitive to pressure changes in the chamber 38.

In the ordinary operation of the regulator, the pressure in the chamber 38 increases only when the slide valve is in the position shown in FIG. 3 and gas from the high-pressure inlet 12 is flowing into the chamber 38. Collapsing movement of the bellows 98 with resulting shifting of the flange 46 and stem 42 toward the left in FIG. 1, moves the slide valve into closed position, as shown in FIG. 4, and stops further increase in pressure in the chamber 38. As gas is withdrawn from the regulator through the delivery or outlet port 14, the pressure in the chamber 38 decreases, the spring tension of the washers 102 and 104 expands the bellows and shifts the flange 46 and stem 42 in a direction to again open the slide valve so as to admit further gas from the inlet port 12.

In the event of temperature rise or other occurrence which increases the downstream pressure, and the pressure in the chamber 38, above the intended delivery pressure of the regulator, the bellows 98 is collapsed sufficiently to move the stem 42 into the position shown in FIG. 5 so that gas can escape from the chamber 38 and the delivery line through the vent passage 80, as previously explained.

Movement of the handle 24 to screw the fitting 18 one way or the other along the housing extension 16 changes the delivery pressure of the regulator by moving the O-ring 48 axially, as already explained, so that different degrees of expansion or collapsing of the bellows 98 are necessary to bring the cross passages 72 into register with the O-ring 48 or into positions with respect to the O-ring for admitting gas to the chamber 38 or to the vent 80.

The preferred embodiment of the invention has been illustrated and described, but changes and modifications can be made and some features can be used in different combinations without departing from the invention as defined in the claims.

We claim:

1. A pressure regulator including a housing having inlet and outlet passages including a first chamber and a bore leading into said chamber, the outlet passage being in communication with said first chamber, a bellows in the chamber, one wall of the bellows being fixed to a part of the housing, a second chamber within the bellows, a slide valve in the bore and having a passage therethrough and connected with the other wall of the bellows, the bore and passage through the slide valve providing communication between the inlet and said first chamber, the slide valve being movable axially along the bore as the bellows contracts to a position in which the slide valve shuts off communication between the inlet passage and said first chamber, and that moves as the bellows expands to a position that puts the inlet passage in communication with said first chamber.

2. The pressure regulator described in claim 1 characterized by the bellows being made of two spring washers that taper to a reduced thickness toward the inner edges, the center opening through one of the washers being closed by a flange structure that connects the slide valve to that washer, the center of the other washer being closed off from communication with the first chamber that surrounds the bellows by structure of the side of the first chamber through which the bore opens, the washers having their outer circumferential edges adjacent to one another, and means sealing the bellows around said outer circumferential edges.

3. The pressure regulator described in claim 2 characterized by the housing having a vent passage leading from within the bellows through the fixed wall of the bellows to a location outside of the housing whereby there is no compression of air within the bellows when the bellows contracts.

4. The pressure regulator described in claim 2 characterized by the outer circumferential portions of the washers having confronting faces that contact one another, a circumferential groove in the circumferences of the washers and extending across the location where the confronting faces contact with one another, and the means for sealing the bellows being an elastomer ring held in said groove.

5. The pressure regulator described in claim 4 characterized by the inner edges of the washers being seated on sealing gaskets on the structure by which the center openings through the washers are closed.

6. The pressure regulator described in claim 1 characterized by the passage through the slide valve including a port opening through a circumferential surface of the slide valve and an axial passage in the slide valve extending through the part of the slide valve that is connected to the bellows and opening into said first chamber of the housing, and an O-ring in a clearance between the slide valve and the bore for sealing the port opening when the slide valve is in closed position.

7. The pressure regulator described in claim 6 characterized by the clearance around the slide valve being a counterbore of the bore that opens into the first chamber which contains the bellows, the end of the counterbore being close to a wall of the first chamber through which the slide valve extends, a sealing ring at the end of the counterbore, porous back-up rings on both sides of the O-ring that seals the port opening of the slide valve, a helical compression spring around the slide valve between the sealing ring at the end of the counterbore and one of the back-up rings of the O-ring a support that contacts with the other back-up ring of the O-ring on the side opposite the spring, and manually operated cam means for moving the support to shift the O-ring axially along the slide valve against the pressure of the spring to adjust the regulator for a different delivery pressure.

8. A pressure regulator including a housing enclosing space therein including a chamber and a bore, means including a movable wall in said chamber, said wall changing its position in response to changes in pressure in said chamber, said means being connected with a fixed part of the housing within said chamber, a slide valve in the bore and connected at one end with the movable wall for movement therewith, inlet and outlet passages to the chamber, one of said passages including a clearance between the slide valve and the bore for a portion of the length of the bore, and including also a port opening through a circumferential surface of the slide valve and an axially extending passage communicating with the port and extending through the slide valve to the chamber, and an O-ring in the clearance between the bore and the port in position and of sufficient axial breadth to seal the port when the slide valve is in a closed position.

9. The pressure regulator described in claim 8 characterized by means for moving the O-ring axially along the slide valve to change the locations of the movable wall and the slide valve when the port is sealed by the O-ring 10. The pressure regulator described in claim 8 characterized by the clearance around the slide valve being a counterbore of said bore, the end of the counterbore being close to a wall of the chamber through which the slide valve extends, a sealing ring at the end of the counterbore, a porous back-up ring on each side of the O-ring that seals the port opening of the slide valve, a helical compression spring around the slide valve between the sealing ring at the end of the counterbore and one of the back-up rings of the O-ring, a support that contacts with the other back-up ring on the side of the O-ring opposite the spring, and manually operated cam means for moving the support to shift the O-ring axially along the slide valve against the pressure of the spring to adjust the regulator for a different delivery pressure.

11. The pressure regulator described in claim 10 characterized by the inlet passage of the regulator opening through the side of the housing and into the counterbore in which the spring is contained.

12. The pressure regulator described in claim 11 characterized by the counterbore on the side of the O-ring remote from the inlet passage communicating with a vent opening to the outside of the housing, and a filter for preventing dirt from entering the counterbore through said vent opening.